(12) United States Patent
Powell

(10) Patent No.: US 7,048,070 B2
(45) Date of Patent: May 23, 2006

(54) QUICK COUPLER ASSEMBLY WITH DUAL HOOK MEMBERS

(75) Inventor: Duane William Powell, La Porte City, IA (US)

(73) Assignee: Deere & Company, Moline, IL (US)

( * ) Notice: Subject to any disclaimer, the term of this patent is extended or adjusted under 35 U.S.C. 154(b) by 32 days.

(21) Appl. No.: 10/621,736

(22) Filed: Jul. 17, 2003

(65) Prior Publication Data

US 2005/0017473 A1    Jan. 27, 2005

(51) Int. Cl.
- *A01B 59/00* (2006.01)
- *A01B 59/43* (2006.01)
- *A01B 59/06* (2006.01)
- *A01B 63/02* (2006.01)
- *A01B 63/118* (2006.01)

(52) U.S. Cl. .................. 172/439; 172/680; 280/416.1; 280/186

(58) Field of Classification Search ................ 172/439, 172/443, 445, 448, 450, 451, 677–680; 280/416, 280/186, 415.1, 416.1, 416.2
See application file for complete search history.

(56) References Cited

U.S. PATENT DOCUMENTS

| | | | |
|---|---|---|---|
| 3,151,883 A | 10/1964 | Stuart | 280/415 |
| 3,231,294 A | 1/1966 | Horney | 280/415 |
| 3,561,788 A | 2/1971 | Carlson et al. | 280/461 |
| 3,572,760 A | 3/1971 | Jones | 280/461 |
| 6,352,124 B1 | 3/2002 | Sancho | 172/439 |

OTHER PUBLICATIONS

ASAE Standards; Attachment of Implements to Agricultural Wheel Tractors Equipped With Quick-Attaching Coupler; 1999; 2 pages.

*Primary Examiner*—Christopher J. Novosad

(57) ABSTRACT

An coupling mechanism includes a cross member, left and right side members projecting from the cross member, and a pair of attaching members which are removably attached to the side members. Each attaching member has an elongated body, a first hook fixed to a first end of the body, and a second hook fixed to a second end of the body. The first hook has at least one dimensional feature which is smaller than a corresponding dimensional feature of the second hook. Each attaching member is mountable in a corresponding one of the side members in a first orientation with the first hook in an operative position and is mountable in a second orientation with the second hook in an operative position. A longer portion of each attaching member projects from a lower end of the corresponding side member when the attaching member is mounted in the first orientation. A shorter portion of each attaching member projects from a lower end of the corresponding side member when the attaching member is mounted in the second orientation. In another embodiment, the attaching members project by the same amount from the side members in their different orientations, and different upper center hooks are used to achieve different vertical spacings between the lower hooks and the center hook.

5 Claims, 4 Drawing Sheets

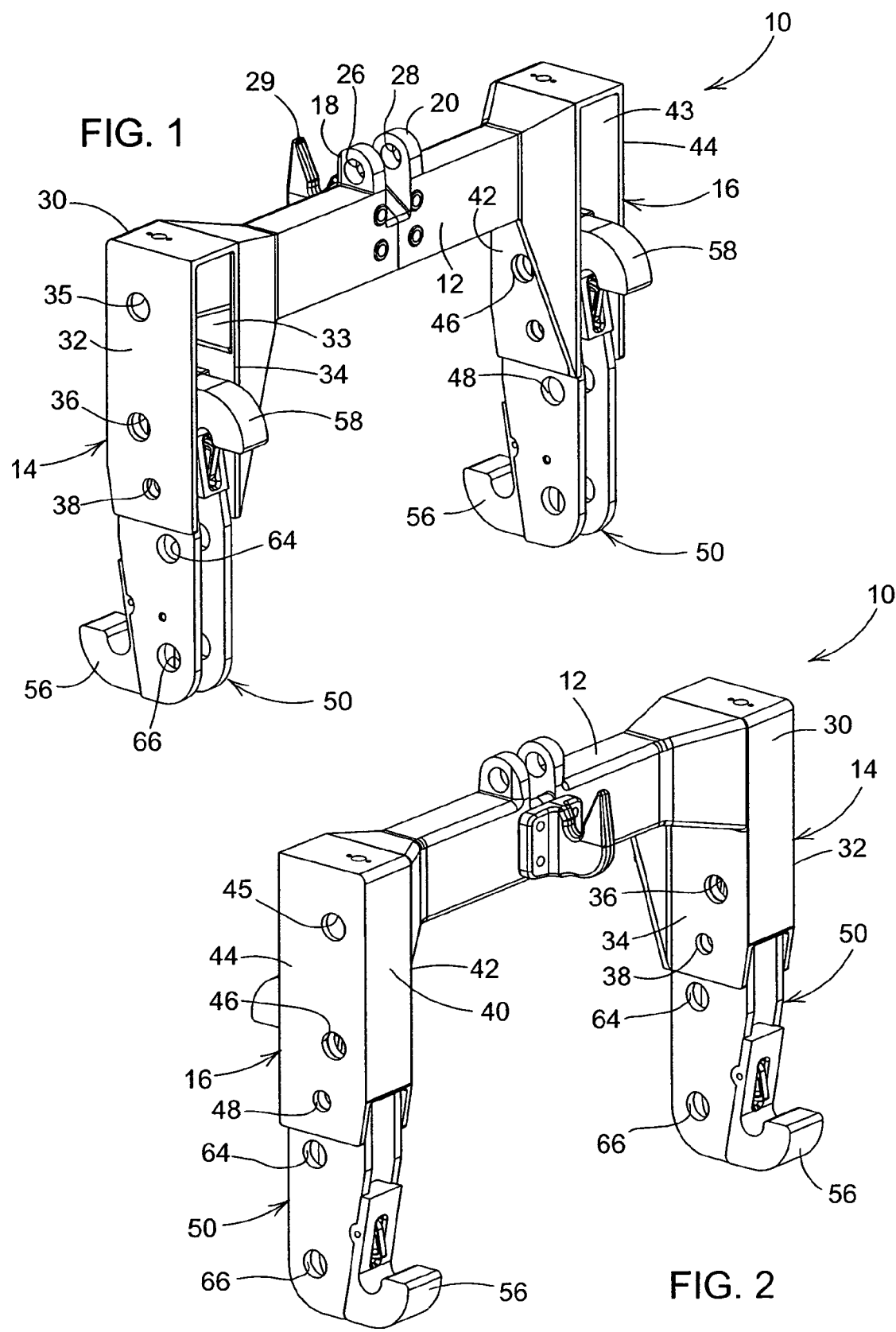

QUICK COUPLER ASSEMBLY WITH DUAL HOOK MEMBERS

BACKGROUND

The present invention relates to a quick coupler for attaching an implement to a vehicle such as an agricultural tractor.

Different sized tractors are normally provided with different sized implement hitches. For example, standards require that larger tractors be provided with a larger category 4N hitch, whereas smaller tractors are normally provided with a smaller category 3 hitch. It is also known to mount a quick coupler to a tractor hitch and then couple an implement to the quick coupler. A larger category 4 quick coupler is normally mounted on a larger category 4 hitch. Yet, there are many hitch-coupled implements which are designed to be coupled with a category 3 hitch. Therefore, it would be desirable to have a quick coupler which can be mounted on a category 4 hitch and which can be modified or adapted to be coupled to either a category 3 or category 4N implement.

SUMMARY

Accordingly, an object of this invention is to provide an adjustable quick coupler mechanism.

A further object is to provide a quick coupler which can be converted to different standard dimensions.

These and other objects are achieved by the present invention, wherein a quick coupler mechanism includes a cross member, left and right side members projecting from the cross member, and a pair of attaching members removably mounted to the side members. Each attaching member has an elongated body, a first hook fixed to a first end of the body, and a second hook fixed to a second end of the body. The first hook has a dimensional feature which is larger than a corresponding dimensional feature of the second hook. Each attaching member is removably mountable in a corresponding one of the side members in a first orientation with the first hook in an operative position, and is removably mountable in a second orientation with the second hook in an operative position. In one embodiment, a longer portion of each attaching member projects from a lower end of the corresponding side member when the attaching member is mounted in the first orientation, and a shorter portion of each attaching member projects from the lower end of the corresponding side member when the attaching member is mounted in the second orientation. In another embodiment, the attaching members project by the same amount from the side members in their different orientations, and different upper center hooks are used to achieve different vertical spacings between the lower hooks and the center hook.

BRIEF DESCRIPTION OF THE DRAWINGS

FIG. 1 is a perspective view of a quick coupler assembly according to the present invention with an attaching member in a first orientation;

FIG. 2 is another perspective view of the quick coupler assembly of FIG. 1;

DETAILED DESCRIPTION

Figure 3:
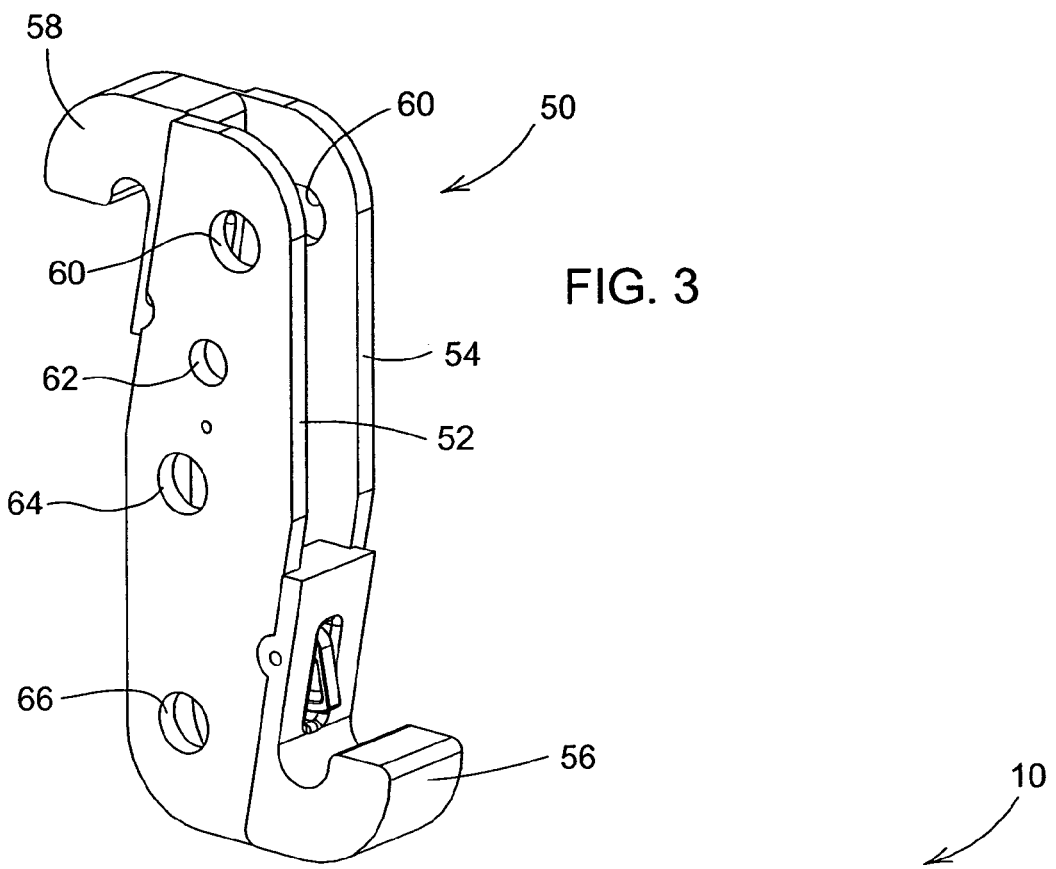
FIG. 3 is a perspective view of the attaching member of FIGS. 1 and 2.

Referring to FIGS. 1, 2 and 3, a quick coupler assembly 10 includes a quick coupler frame having an upper cross member 12 and right and left downward extending side members 14 and 16. A pair of upper mounting tabs 18 and 20 are spaced apart and project upwardly from a top surface of cross member 12. A pair of lower mounting tabs (not shown) are spaced apart and project downwardly from a bottom surface of cross member 12. Tabs 18 and 20 include a pair of aligned bores 26 and 28 for use in coupling the frame to a center hitch link of a tractor (not shown). An upper or center hook 29 is mounted to a central portion of cross member 12.

Right side member 14 includes a rear plate 30 and a pair of spaced apart side plates 32 and 34 which form a rectangular slot 33 which extends upwardly from the lower end of plates 30–34. The slot 33 is open in the forward direction. Aligned pairs of coupling bores 35, 36 and 38 extend through plates 32 and 34.

Left side member 16 includes a rear plate 40 and a pair of spaced apart side plates 42 and 44 which form a rectangular slot 43 which extends upwardly from the lower end of plates 40–44. Slot 43 is also open in a forward direction. Aligned pairs of mounting bores 45, 46 and 48 extend through plates 42 and 44.

Identical dual hook attaching members 50 are removably mounted in the slots 33, 43, respectively, of each side member 14, 16. Referring now to FIG. 3, each attaching member 50 includes a hollow elongated body which includes a pair of spaced apart side plates 52 and 54. A larger lower hook member 56 is fixed between one end of plates 52 and 54, and a smaller lower hook member 58 is fixed between the other ends thereof. Aligned pairs of mounting bores 60, 62, 64 and 66 extend through plates 52 and 54. By comparing FIGS. 2 and 3 it can be seen that hook 56 has a larger width than the width of hook 58. Hooks 56 and 58 may be integral with or welded to plates 52, 54. Hooks 56 and 58 have prongs which project generally away from opposite sides of the elongated body of the attaching member 50 and towards a plane which bisects the central portion of the elongated body.

Referring again to FIG. 1, the members 50 are mounted in side members 14 and 16 so that bores 60 are aligned with bores 36 and 46 and so that bores 62 are aligned with bores 38 and 48. Pins (not shown) are placed through these aligned bores to hold the attaching members 50 in place within the side members 14 and 16. This causes slightly more than half of the length of members 50 to extend out from the lower ends of side members 14 and 16, and results in a relatively large vertical spacing between upper hook 29 and hooks 56. This also places the larger hook members 56 in operative positions projecting rearwardly from the lower ends of members 50, and places the smaller hook members 58 in an inoperative position projecting forwardly from the upper ends of members 50. The result is a quick coupler assembly which is suitable for connecting to a large implement, such as a category 4 implement.

Figure 4:
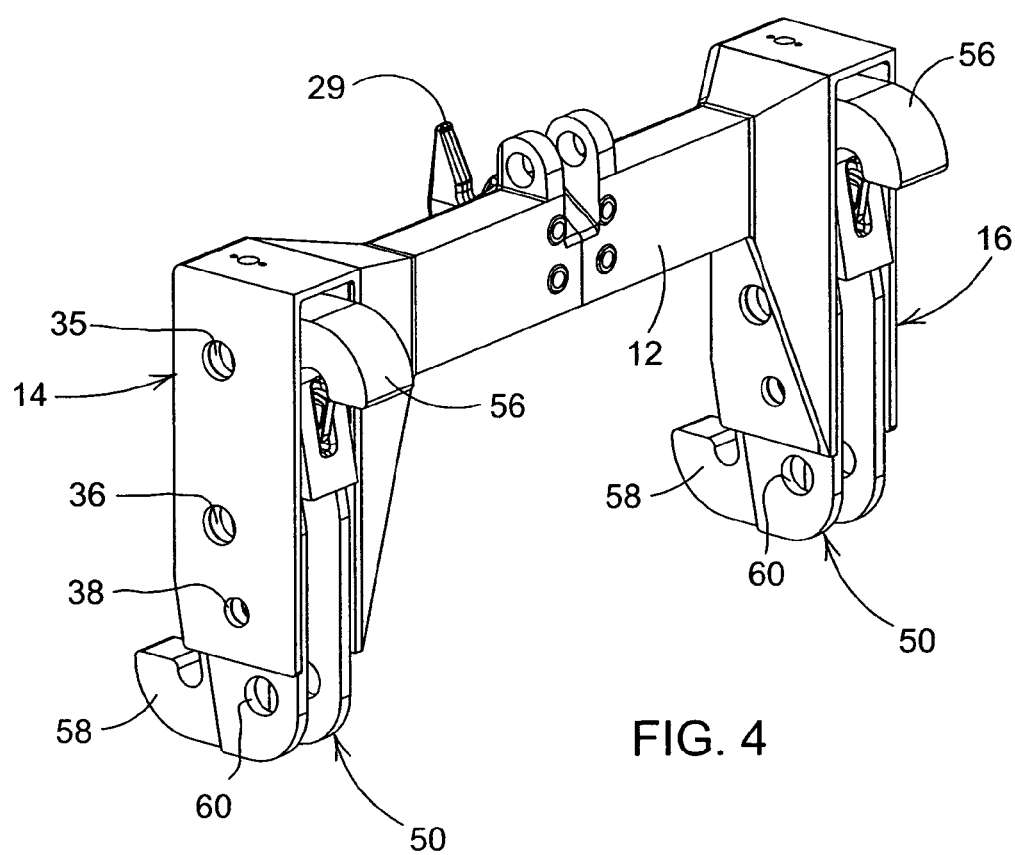
FIG. 4 is a perspective view of the quick coupler assembly of FIG. 1 with the attaching member in a second orientation.

Referring now to FIG. 4, the members 50 are mounted in side members 14 and 16 so that bores 66 are aligned with bores 35 and 45, so that bores 64 are aligned with bores 36 and 46, and so that bores 62 are aligned with bores 38 and 48. This causes only a small portion of the length of members 50 to extend out from the lower ends of side members 14 and 16. This also places the smaller hook members 58 in operative positions projecting rearwardly from the lower ends of members 50, and places the larger hook members 56 in an inoperative position projecting forwardly from the upper ends of members 50. It should be noted that the upper bores 35 and 45 are optional, and can be used to provide additional security against rearward directed forces applied to hooks 58. The result is a quick coupler assembly which is suitable for connecting to a smaller implement, such as a category 3 implement.

The quick coupler assembly 10 can be quickly converted from one condition to the other by removing pins, flipping the attaching members 50 about a horizontal axis and reinstalling them into the side members 14, 16.

Figure 5:
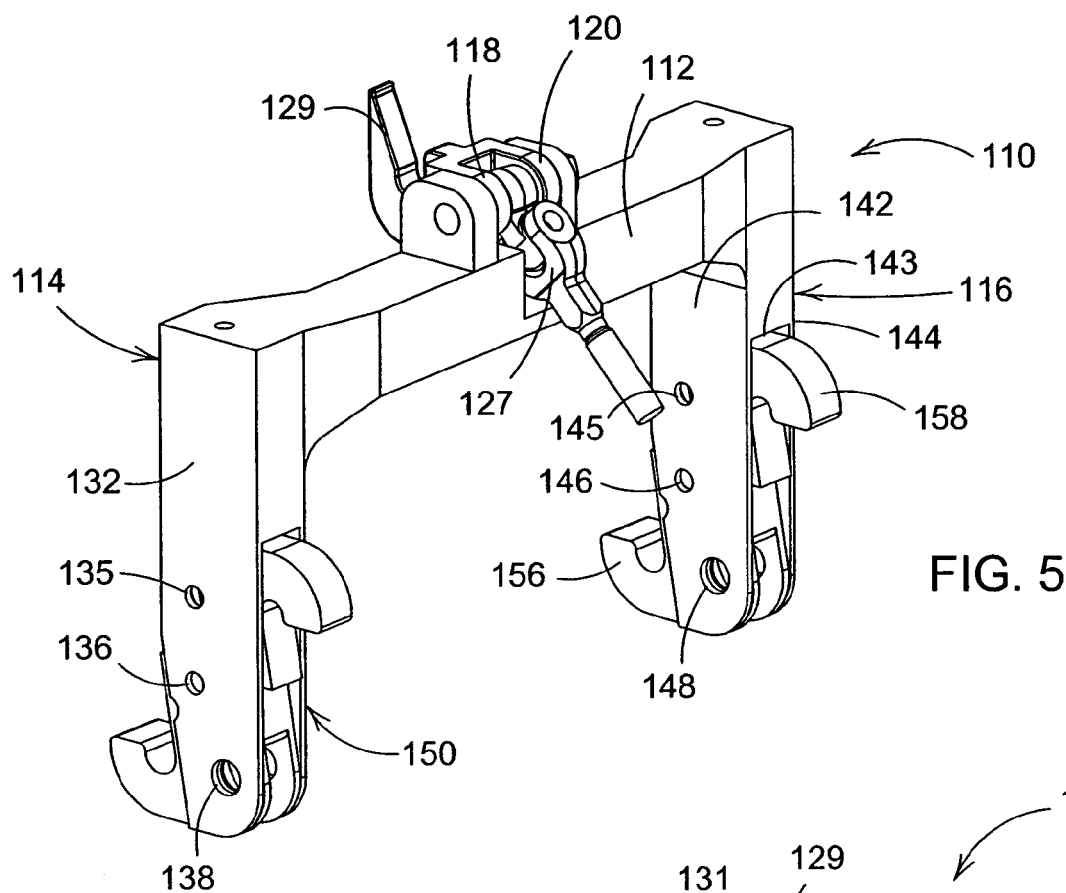
FIG. 5 is a perspective view of a quick coupler assembly according an alternate embodiment of the present invention.
Figure 6:
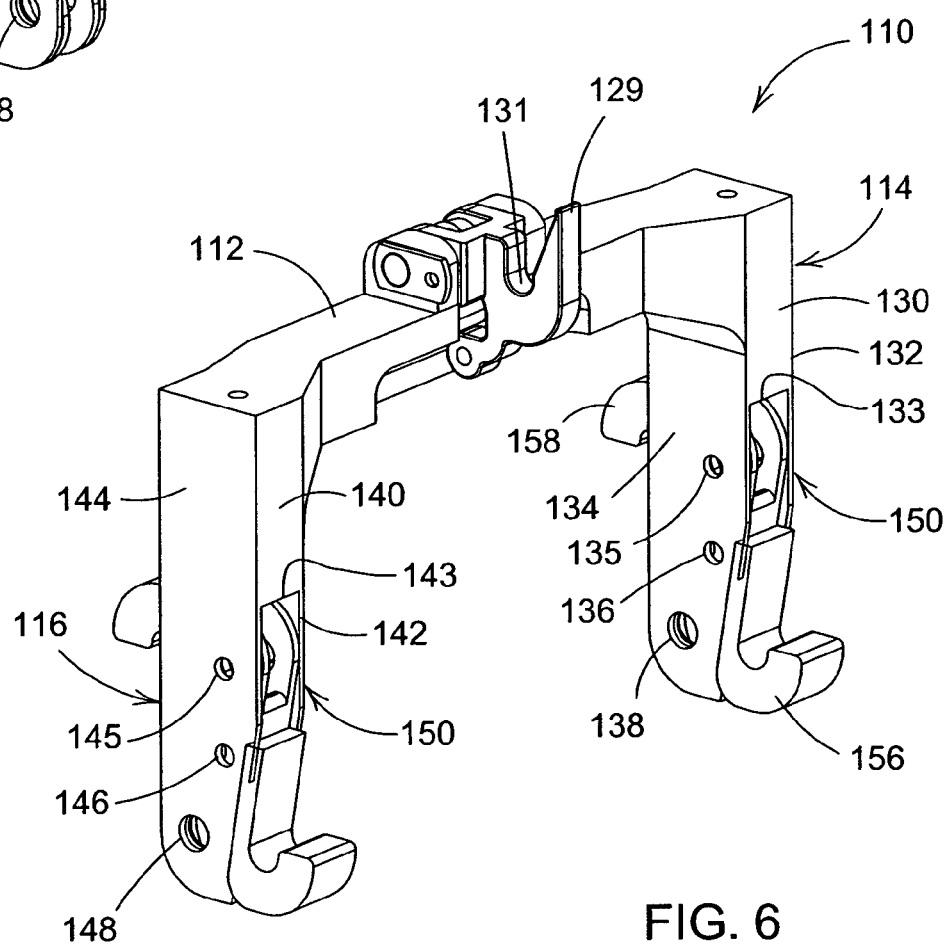
FIG. 6 is another perspective view of the quick coupler assembly of FIG. 5.
Figure 7:
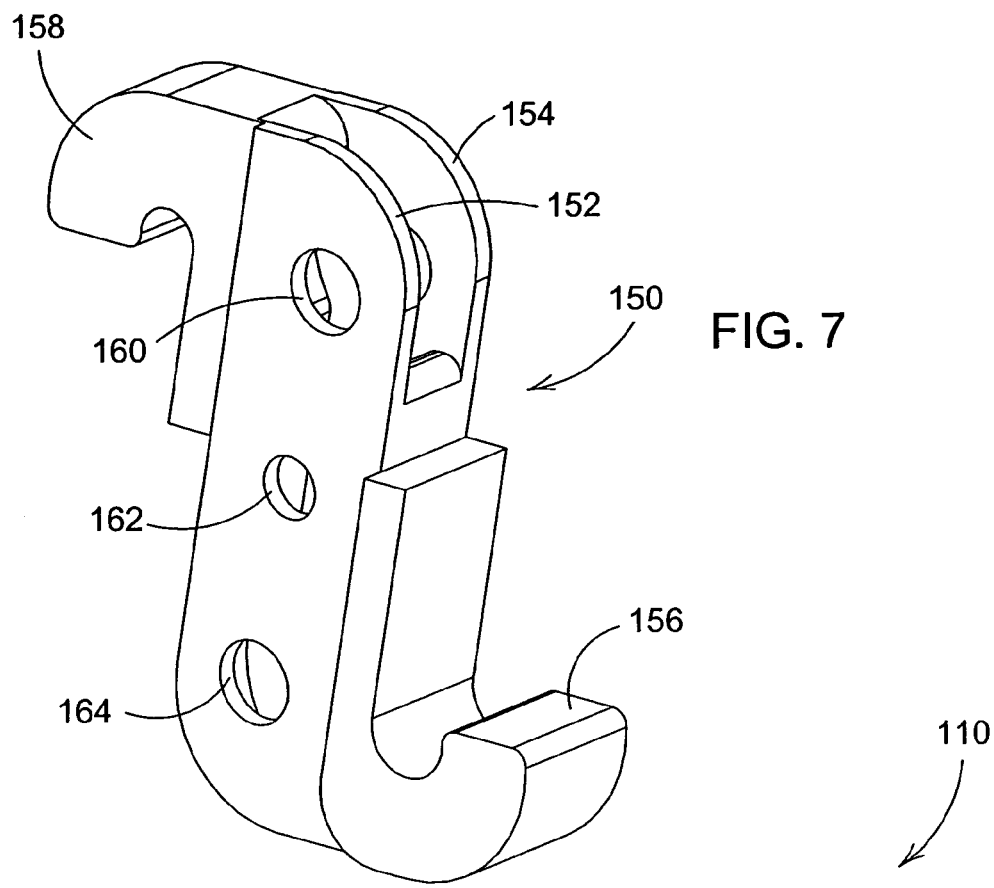
FIG. 7 is a perspective view of the attaching member of FIGS. 5 and 6.

Referring now to FIGS. 5–7, a alternate embodiment quick coupler assembly 110 includes a quick coupler frame having an upper cross member 112 and right and left downward extending side members 114 and 116. A pair of upper mounting tabs 118 and 120 are spaced apart and project upwardly from a top surface of cross member 112. A pair of lower mounting tabs (not shown) are spaced apart and project downwardly from a bottom surface of cross member 112. Tabs 118 and 120 include a pair of aligned bores for use in coupling the frame to a center hook 129 and to an end of an upper hitch link 127 tractor (not shown). Center hook 129 has a prong which is positioned generally above the bottom surface of cross member 112. Hook 129 defines an implement coupler receiving and engaging surface 131 which has a bottom or lower portion which is located at a vertical position which is above a lower surface of the cross member 112.

Right side member 114 includes a rear plate 130 and a pair of spaced apart side plates 132 and 134 which form a rectangular slot 133 which extends upwardly from the lower end of plates 130–134. The slot 133 is open in the forward and rearward directions. Aligned pairs of coupling bores 135, 136 and 138 extend through plates 132 and 134.

Left side member 116 includes a rear plate 140 and a pair of spaced apart side plates 142 and 144 which form a rectangular slot 143 which extends upwardly from the lower end of plates 140–144. Slot 143 is also open in forward and rearward directions. Aligned pairs of mounting bores 145, 146 and 148 extend through plates 142 and 144.

Identical dual hook attaching members 150 are removably mounted in the slots 133, 143, respectively, of each side member 114, 116. Referring now to FIGS. 6 and 7, each attaching member 150 includes a hollow elongated body which includes a pair of spaced apart side plates 152 and 154. A larger hook member 156 is fixed between one end of plates 152 and 154, and a smaller hook member 158 is fixed between the other ends thereof. Aligned pairs of mounting bores 160, 162, 164 and 166 extend through plates 152 and 154. By comparing FIGS. 2 and 3 it can be seen that hook 156 has a larger width than the width of hook 158. Hooks 156 and 158 may be integral with or welded to plates 152, 154.

Referring again to FIG. 6, the members 150 are mounted in side members 114 and 116 so that bores 160 are aligned with bores 135 and 145, so that bores 162 are aligned with bores 136 and 146, and so that bores 164 are aligned with bores 138 and 148, respectively. Pins (not shown) are placed through these aligned bores to hold the attaching members 150 in place within the side members 114 and 116. With hook 129 this results in a relatively large vertical spacing between upper hook 129 and hooks 156. This also places the larger hook members 156 in operative positions projecting rearwardly from the lower ends of members 150, and places the smaller hook members 158 in an inoperative position projecting forwardly from the upper ends of members 150. The result is a quick coupler assembly which is suitable for connecting to a large implement, such as a category 4 implement.

Figure 8:
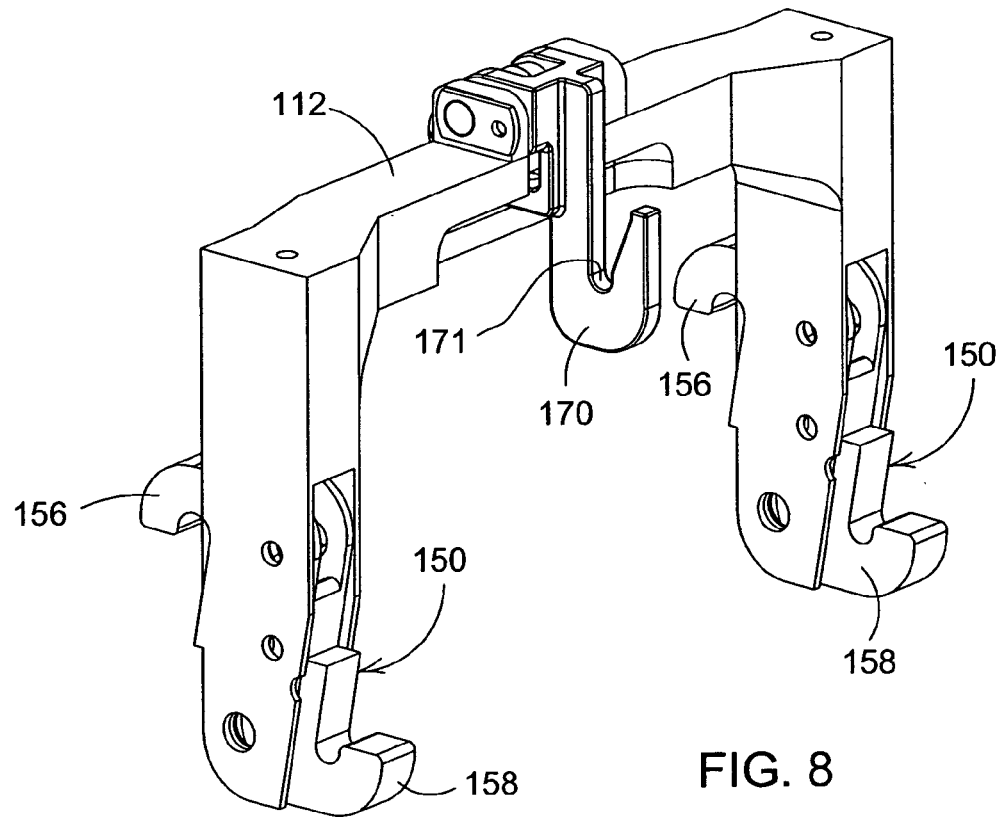
FIG. 8 is a perspective view of the quick coupler assembly of FIG. 5 in a different condition.

Referring now to FIG. 8, the members 150 are mounted in side members 114 and 116 so that bores 164 are aligned with bores 135 and 145, so that bores 162 are aligned with bores 136 and 146, and so that bores 160 are aligned with bores 138 and 148, respectively. An upper hook 170 with a longer shank is mounted on the cross member 112 so that the operative portion of hook 170 is positioned below cross member 112. This places the smaller hook members 158 in operative positions projecting rearwardly from the lower ends of members 150, and places the larger hook members 156 in an inoperative position projecting forwardly from the upper ends of members 150. Hook 170 defines an implement coupler receiving and engaging surface having a bottom portion 171 which is located at a vertical position which is below a lower surface of the cross member 112.

This results in a relatively small vertical spacing between upper hook 170 and hooks 158, as compared to the vertical spacing between upper hook 129 and hooks 156 as shown in FIG. 2. The result is a quick coupler assembly which is suitable for connecting to a smaller implement, such as a category 3 implement. The quick coupler assembly 110 can be quickly converted from one condition to the other by replacing hook 129 with hook 170 (vice versa) and by removing pins, flipping the attaching members 150 about a horizontal axis and reinstalling them into the side members 114, 116.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a coupling mechanism for a work vehicle, the coupling mechanism having a frame for mounting to the work vehicle, the frame having a cross member and left and right side members attached to and extending downwardly from opposite ends of the cross member, having an upper central implement coupling hook mounted on the cross member, and having left and right lower implement coupling hooks positioned lower than the upper central hook, the improvement comprising:

a left attaching member mounted to the left side member, the left attaching member comprising an elongated left body, a first implement coupling hook fixed to a first end of the left body, and a second implement coupling hook fixed to a second end of the left body, the first implement coupling hook having at least one dimensional feature which is larger than a corresponding dimensional feature of the second implement coupling hook, the left attaching member being selectively mountable in the left side member in a first orientation with the first implement coupling hook in an lower operative position and being selectively mountable in the left side member in a second orientation with the second implement coupling hook in an lower operative position; and a right attaching member mounted to the right side member, the right attaching member comprising an elongated right body, a first implement coupling hook fixed to a first end of the right body, and a second implement coupling hook fixed to a second end of the right body, the first implement coupling hook having at least one dimensional feature which is larger than a corresponding dimensional feature of the second hook, the right attaching member being selectively mountable in the right side member in a first orientation with the first implement coupling hook in an lower operative position and being selectively mountable in the right side member in a second orientation with the second implement coupling hook in an lower operative position.

2. The coupling mechanism of claim 1, wherein:

a first longer portion of each attaching member projects from a lower end of the corresponding side member when the attaching member is mounted to the corresponding side member in said first orientation, and a second shorter portion of each attaching member projecting from a lower end of the corresponding side member when the attaching member is mounted to the corresponding side member in said second orientation.

3. The coupling mechanism of claim 1, wherein:

a plurality of mounting bores extend though each attaching member; and a plurality of coupling bores extend through each side member, a first group of the mounting bores being aligned with a first set of the coupling bores when the attaching member is in the first orientation, a second group of the mounting bores being aligned with a second set of the coupling bores when the attaching member is in the second orientation.

4. The coupling mechanism of claim 1, wherein:

the first and second implement coupling hooks of the left and right attaching members have prongs which project from opposite sides of the elongated body.

5. The coupling mechanism of claim 1, wherein:

the first and second implement coupling hooks of the left and right attaching members have prongs which project from opposite sides of the elongated body and generally towards a plane which bisects a central portion of the elongated body.

* * * * *